(12) United States Patent
Hosoya

(10) Patent No.: US 6,201,578 B1
(45) Date of Patent: Mar. 13, 2001

(54) APPARATUS WITH A/D CONVERTER FOR PROCESSING TELEVISION SIGNAL

(75) Inventor: Nobukazu Hosoya, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 08/757,598

(22) Filed: Nov. 29, 1996

(30) Foreign Application Priority Data

| Nov. 30, 1995 | (JP) | 7-312105 |
|---|---|---|
| Nov. 30, 1995 | (JP) | 7-312106 |
| Nov. 30, 1995 | (JP) | 7-312107 |
| Nov. 30, 1995 | (JP) | 7-312108 |
| Nov. 30, 1995 | (JP) | 7-312109 |
| Nov. 30, 1995 | (JP) | 7-312110 |

(51) Int. Cl.$^7$ .................................... H03M 1/12
(52) U.S. Cl. ................. 348/572; 348/638; 348/644
(58) Field of Search ........................ 348/572, 638, 348/644, 631, 663, 653, 573, 571, 536, 537, 539, 708, 713, 540, 505, 506, 639, 654, 662; 386/26

(56) References Cited

U.S. PATENT DOCUMENTS

| 4,216,493 | * | 8/1980 | Hosoya | 348/654 |
|---|---|---|---|---|
| 4,291,332 | | 9/1981 | Kato et al. | 358/19 |
| 4,463,371 | * | 7/1984 | Lewis, Jr. | 348/539 |
| 4,527,145 | | 7/1985 | Haussmann et al. | 358/19 |
| 4,670,776 | | 6/1987 | Matsumoto | 358/40 |
| 4,700,217 | * | 10/1987 | Balaban et al. | 348/639 |
| 5,742,727 | * | 4/1998 | Kanota et al. | 348/26 |

FOREIGN PATENT DOCUMENTS

| 57 073 584 | 5/1982 | (EP) . |
|---|---|---|
| 0 461 896 A2 | 12/1991 | (EP) . |
| 0 472 332 A1 | 2/1992 | (EP) . |

\* cited by examiner

*Primary Examiner*—Chris S. Kelley
*Assistant Examiner*—Gims Philippe
(74) *Attorney, Agent, or Firm*—Armstrong, Westerman, Hattori, McLeland & Naughton

(57) ABSTRACT

An apparatus for processing television signal including an A/D converter which converts a television signal (a luminance signal) into a digital television signal. A sampling circuit samples television signal data outputted from the A/D converter in response to a sampling clock outputted from a VCO included in a PLL, and outputs sampled data. An output of the A/D converter is also applied to a band elimination filter which outputs luminance signal data that a chrominance signal component is completely eliminated. The sampled data and the luminance signal data are compared with each other by a comparator, and an output of the comparator is applied to a low-pass filter included in the PLL during a burst period. An output of the low-pass filter becomes a control voltage signal for the VCO, whereby an oscillation frequency (phase) of the VCO is controlled.

11 Claims, 12 Drawing Sheets

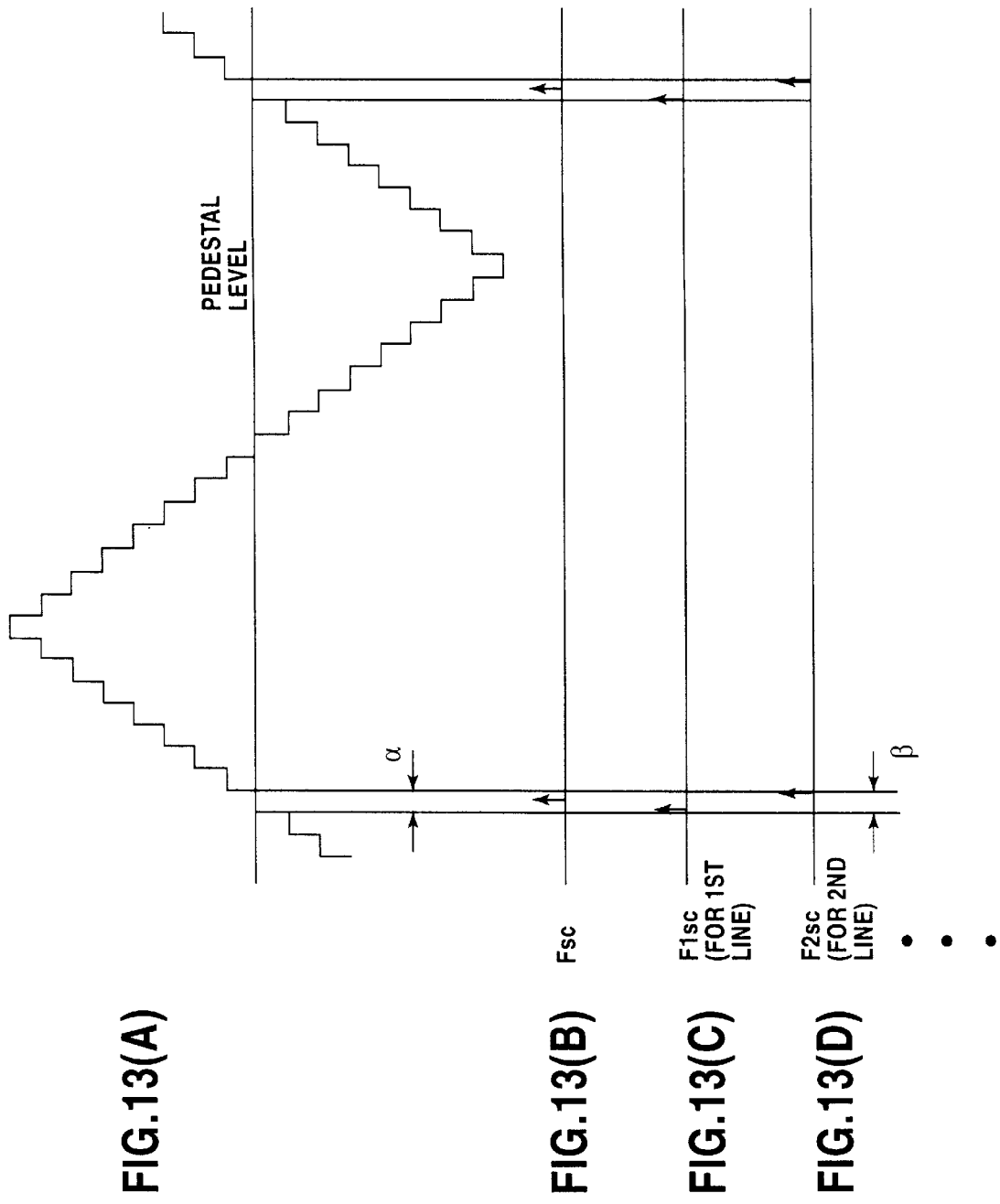

APPARATUS WITH A/D CONVERTER FOR PROCESSING TELEVISION SIGNAL

BACKGROUND OF THE INVENTION

1. Field of the Invention

The present invention relates to an apparatus with on A/D converter for processing a color television signal. More specifically, the present invention relates to an apparatus which is utilized in a video recording/reproducing apparatus, a television receiver, and etc., and includes an A/D converter which converts a color television signal into color television signal data (digital color television signal).

2. Description of the Prior Art

In order to sample a color television signal (hereinafter, simple referred to as a television signal); and by an A/D converter in synchronous with a color burst signal included in the television signal, conventionally, a so-called burst PLL (Phase-Locked Loop) is constructed, and a sampling clock is obtained form an output of the PLL.

More specifically, with referring to FIG. 1 showing prior art, an inputted composite color television signal is applied an A/D converter 3 via a low-pass filter 1 and a pedestal clamp circuit 2 and subjected to an A/D conversion on the basis of a sampling clock which is produced by a PLL and has a frequency of 4 Fsc (four times a frequency of a subcarrier signal).

In the PLL 4, the composite color television signal is applied to a bandpass filter 4a so as to be subjected to a Y/C separation. A chrominance signal component (a burst signal) from the bandpass filter 4a is given to a phase comparator 4b. The composite color television signal is also applied to a synchronization signal separation circuit 4c. A burst gate pulse is produced by a burst gate pulse generation circuit 4d on the basis of a horizontal synchronization signal outputted form the synchronization signal separation circuit 4c, and the phase comparator 4b is enable by the burst gate pulse. Therefore, the phase comparator 4b compares a phase of the above-described burst signal with an output of a frequency-division circuit 4f which frequency-divides an oscillation signal of a VCO 4e having an oscillation frequency of 4 Fsc by 1/N (¼, for example). An output of the phase comparator 4b is applied to the VCO 4e. Thus, the burst PLL 4 is constructed.

Then, an output of the A/D converter 3 is processed by a 3-dimension Y/C separation circuit 5a, etc., in a digital signal processor (DSP) 5, and applied to D/A converters 6a and 6b so as to be converted again into an analog luminance signal and an analog chrominance signal. Outputs of the D/A converters 6a and 6b are further applied to demodulation circuit (not shown) so as to be demodulated with an analog signal processing.

In the prior art of FIG. 1, there is a possibility that an indefinite phase error occurs between the sampling clock applied to the A/D converter 3 and the burst signal due to influences of temperature drifts in the bandpass filter 4a, the pedestal clamp circuit 2, etc. Therefore, color demodulation by a digital signal processing cannot be performed properly, and accordingly, as shown in FIG. 1, color demodulation is performed after the digital chrominance signal is converted into the analog chrominance signal by the D/A converter 6B. Therefore, there are disadvantages in that not only a circuit configuration becomes complex but also a signal processing efficiency is bad.

It is possible to solve the disadvantage in the prior art shown in FIG. 1 of the indefinite phase error occurring between the sampling clock and the burst signal by FIG. 2 prior art.

In the prior art circuit of FIG. 2, there are provided a phase comparator 7 and a phase shifter 8 in the DSP 5, and a phase error between the burst signal (burst data) that is converted into a digital signal by the A/D converter 3 and the sampling clock form the VCO 4e detected, and a phase of the sampling clock is changed according to the phase error by the phase shifter 8, and then the sampling clock is applied to the 3-dimension Y/C separation circuit 5a.

In the prior art of FIG. 2, in order to eliminate an influence of noise, it is necessary to average the burst data within one field, for example, and therefore, there is a disadvantage in that it is necessary to provide a memory having a large capacity capable of storing a large number of burst data.

SUMMARY OF THE INVENTION

A principal object of the present invention is to provide an apparatus capable of obtaining a clock signal which is in synchronous with a digital burst signal with a simple circuit configuration.

In an apparatus according to the present invention, by applying a control signal to a circuit to be controlled, a signal in which at least one of a phase and a level is controlled is outputted from the circuit to be controlled. The apparatus comprises: A/D converter means which performs an A/D conversion of at least an intermittent reference frequency signal included in a television signal; sampling means which samples an output of the A/D converter means in response to a sampling clock and outputs sampled data; comparative signal data generation means which generates comparative signal data that is a constant level during at least a comparison period; comparison means which compares the sampled data and the comparative signal data; and control signal generation means which applies the control signal to the circuit to be controlled on the basis of an output of the comparison means during a period of the reference frequency signal.

The circuit to be controlled is a VCO having an oscillation frequency which is changed by the control signal or a pedestal clamp circuit having a clamp level which is changed by the control signal.

A/D converter means performs the A/D conversion of the at least intermittent reference frequency signal, e.g., a color burst signal of the television signal on the basis of the an oscillation signal (the sampling clock) from the VCO. The output of the A/D converter means is sampled by the sampling means with the reference frequency. The comparative data generation means generates the comparative signal data having a constant level or an approximately constant level during at least the comparison period e.g., luminance signal data or pedestal level data. The control signal is generated on the basis of the output of the comparison means which compares the sampled data and the comparative signal data with each other, and the control signal is applied to the circuit to be controlled, e.g. the VCO or the pedestal clamp circuit during the period of the reference frequency signal (the color burst signal).

In a case where the circuit to be controlled is the VCO, a capacitor of an analog low-pass filter is charged or discharged in response to a high level signal or a low level signal form the comparison means, and therefore, the low-pass filter outputs the control signal by which the oscillation frequency of the VCO is made smaller or larger.

In a case where the circuit to be controlled is the pedestal clamp circuit, a capacitor included in the pedestal clamp circuit is charged or discharged in response to a high level signal or a low level signal from the comparison means, and therefore, the clamp level is made larger or smaller.

In accordance with the present invention, it is possible to generate a clock signal having a fixed phase in relation to the digital reference frequency signal while utilizing a simple circuit configuration. Furthermore, according to the present invention, since the clamp level of the pedestal clamp circuit can be maintained at constant with a simple circuit configuration, it is possible to fully use an entire dynamic range of the A/D converter means.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a wave-form chart showing an operation of the phase shifter in the embodiment shown in FIG. 11.

DETAILED DESCRIPTION OF THE PREFERRED EMBODIMENT

Figure 1:
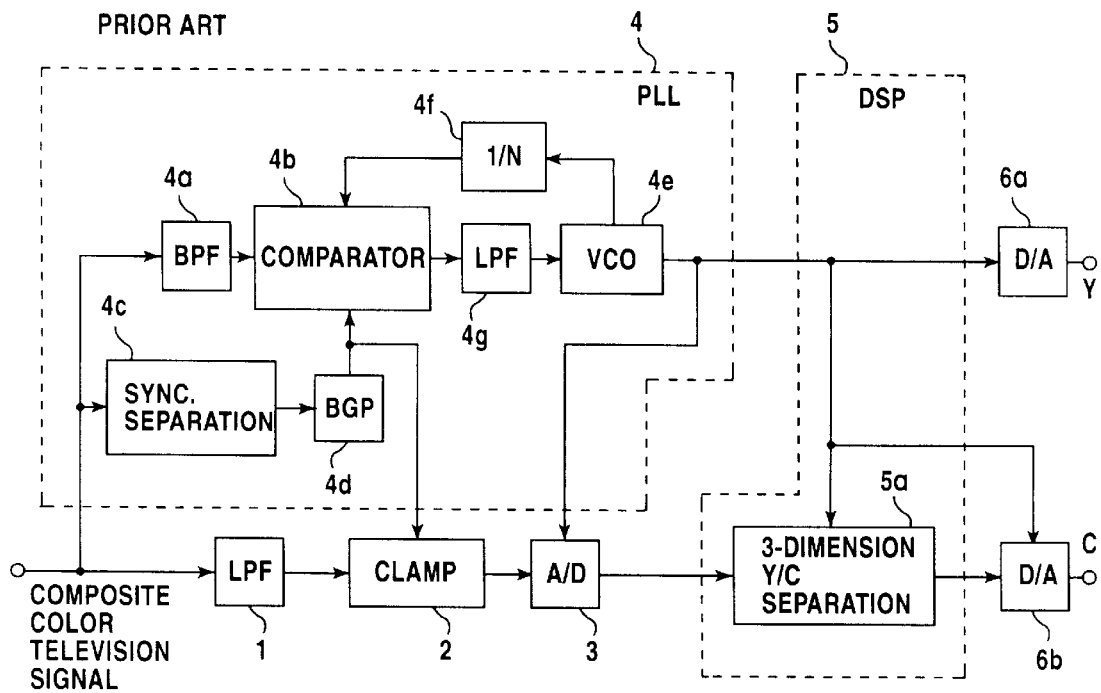
FIG. 1 is a block diagram showing one example of the prior art.
Figure 2:
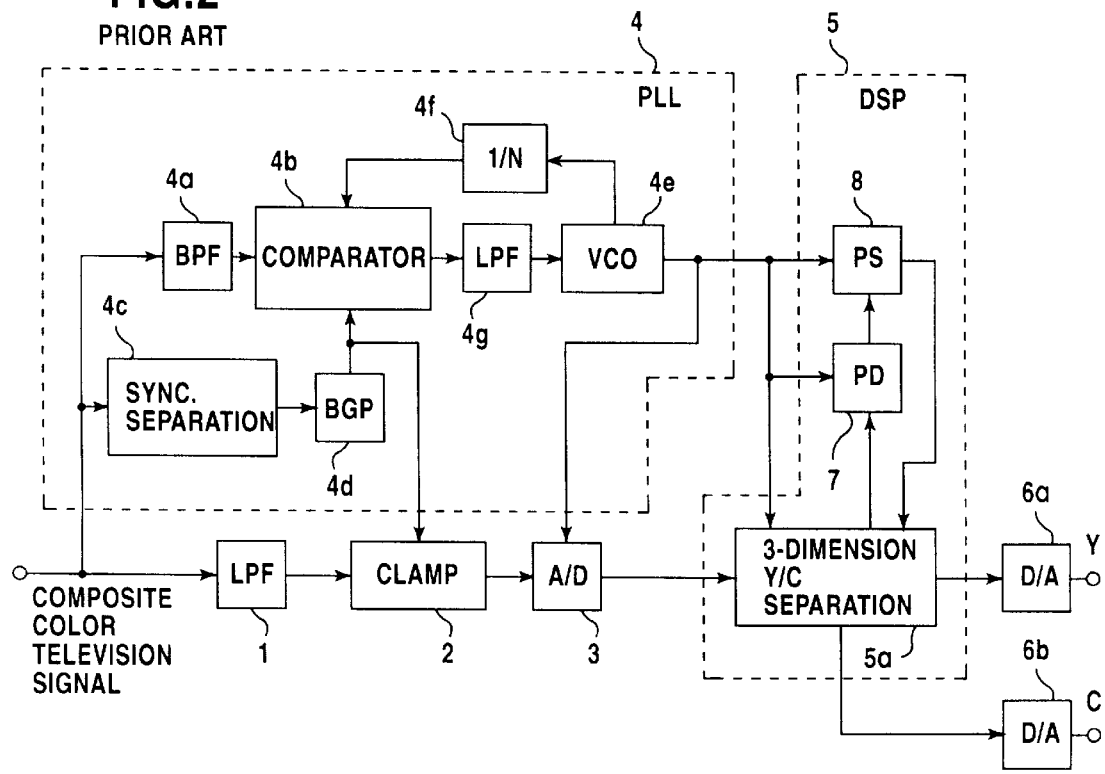
FIG. 2 is a block diagram showing another example of the prior art.
Figure 3:
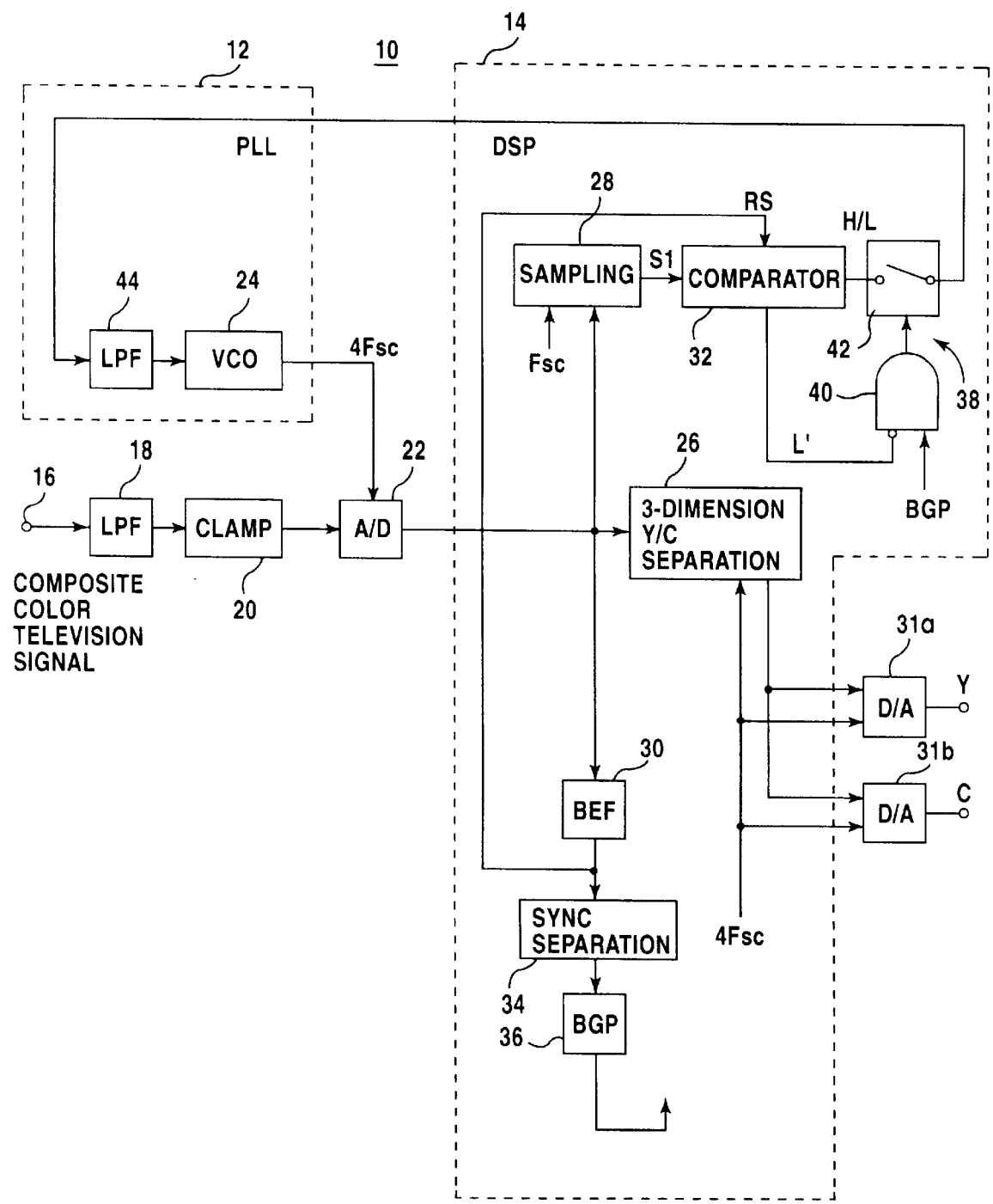
FIG. 3 is a block diagram showing one embodiment according to the present invention.

With referring to FIG. 3, an apparatus 10 of this embodiment shown includes a PPL 12 and a DSP (digital signal processor) 14. A composite color television signal being inputted from an input terminal 16 is applied to a low-pass filter 18. In order to prevent an aliasing noise which occurs at a time that an analog signal is converted into a digital signal, a television signal component having a frequency higher than an Nyquist frequency (half of a sampling frequency) is removed by the low-pass filter 18. That is, the low-ass filter 18 is equal to a Y/C separation circuit, and therefore, a luminance signal component of the television signal is outputted form the low-pass filter 18, and the luminance signal component is applied to a clamp circuit 20.

A clamp circuit 20 is a so-called pedestal clamp which clamps the television signal (luminance signal) at a pedestal level, and therefore, a clamp level of the television signal is adjusted by the clamp circuit 20. The television signal (luminance signal) having the pedestal level which is controlled at constant by the clamp circuit 20 is applied to an A/D converter 22. The television signal (luminance signal) is converted into a digital television signal (luminance signal) in response to a sampling clock which has a frequency of 4 Fsc (four times a frequency of a subcarrier signal) and outputted form a VCO included in the PLL 12.

The digital television signal, i.e., video data is applied to a 3-dimension Y/C separation circuit 26 included in the DSP 14, and is further applied to a sampling circuit 28 and a band elimination filter (BEF) 30 both included in the same DSP 14. In the 3-dimension Y/C separation circuit 26, the video data is subjected to a Y/C separation process according to a clock signal (4 Fsc=14.3 MHz) from the VCO 24. A luminance signal (Y) and a chrominance signal (C) which are outputted from the Y/C separation circuit 26 are respectively applied to D/A converters 31a and 31b so as to be converted into analog signals, respectively.

The digital television signal, i.e., the video data inputted to the sampling circuit 28 is sampled with a subcarrier frequency (Fsc), and therefore, sampled data (SI) is outputted from the sampling circuit 28 to a comparator 342. In the comparator 32, the sampled data (SI) is compared with luminance signal data such that a subcarrier frequency component is sufficiently eliminated by the BEF 30. The comparator 32 outputs a high level signal or a low level signal according to a difference between the sampled date (SI) and the luminance signal data (RS).

Furthermore, the luminance signal data processed by the BEF 30 is applied to a synchronization signal separation circuit 34. A burst gate pulse generation circuit 36 generates a burst gate pulse (BGP) on the basis of a horizontal synchronization signal form the synchronization signal separation circuit 34. That is, the burst gage pulse generation circuit 36 includes a counter (not shown) which counts a time form the horizontal synchronization signal and a decoder (not shown) which decodes an output of the counter, and outputs the burst gate pulse during a predetermined period.

The burst gate pulse (BGP) outputted from the burst gate pulse generation circuit 36 is applied to a control signal generation circuit 38, whereby the output of the comparator 32 is applied to the PLL 12 only during a period of the burst signal (burst period). More specifically, the control signal generation circuit 38 includes an AND gate 40 which receives at its inputs an inversion of the output of the comparator 32 and the burst gate pulse from the burst gate pulse generation circuit 36, and a tri-state switch 42 having three states which are changed-over by an output of the AND gate 40. Therefore, a high level signal is outputted form the AND gate 40 only during the burst period at a time that there is a difference (phase difference) between the sampled data (SI) and the luminance signal date (RS) from the BEF 30. In response to the high level signal, the tri-state switch 42 becomes conductive. Accordingly, the high level signal form the comparator 32 is applied to a low-pass filter 44 included in the PLL via the tri-state switch 42 only during the burst period.

The low-pass filter 44 includes a capacitor (not shown), and outputs a voltage signal according to the difference (phase error) between the both signal data (RI and RS), and the voltage signal is applied to the VCO 24.

Figure 4A:
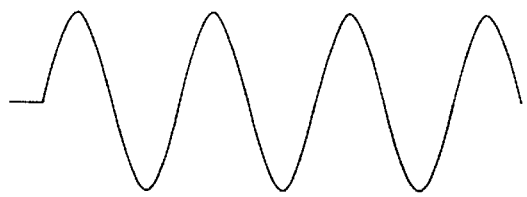
FIG. 4 is a wave-form chart showing a phase comparison operation in a comparator 32 in the embodiment shown in FIG. 1.
Figure 4B:
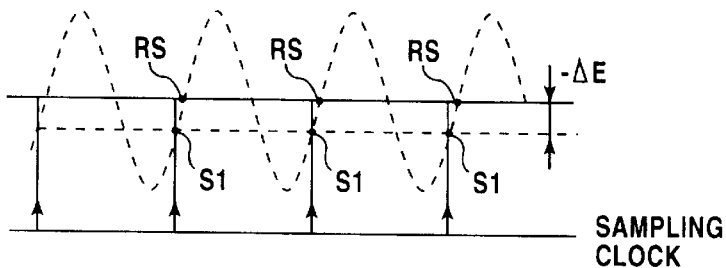

More specifically, FIG. 4(A) shows the subcarrier signal included in the television signal as inputted. Then, in the comparator 32, output signal data (RS) from the BEF 30 and the sampled data (SI) form the sampling circuit 28 shown in FIG. 4(D) are compared with each other. Then, as shown in FIG 4(B), if the data (RS) is larger than the sampled data (SI), (SI−RS≐−ΔE), that is, if the subcarrier signal included in the television signal is advanced to the sampling clock from the PLL 12, the high level signal is outputted form the comparator 32 to the tri-state switch 42.

At this time, a changing -over signal (L') of a low level, for example, is also outputted form the comparator 32 to the AND gate 40. The changing-over signal (L') is outputted in a case where there is a difference (phase difference) between both the data (SI and RS) inputted to the comparator 32. In response to the changing-over signal (L') and the burst gate pulse (BGP) form the burst gate pulse generation circuit 36, the tri-state switch 42 becomes conductive, and therefore, the high level signal from the comparator 32 is applied to the low-pass filter 44. According to the high level signal, the capacitor (not shown) of the low-pass filter 44 is charged. Therefore, a control signal by which an oscillation frequency of the VCO 24 is made smaller is outputted form the low-pass filter 44.

Figure 4C:
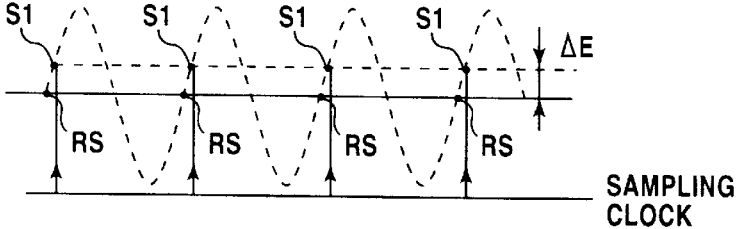
Figure 4D:
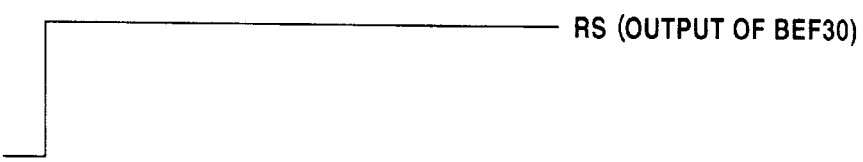

On the other hand, as shown in FIG. 4(C), if the data (RS) from the BEF 30 is smaller than the sampled data (SI), (SI−RS=ΔE), that is, if the subcarrier signal is delayed to the sampling clock, the low level signal is outputted from the comparator 32. Therefore, the tri-state switch 42 becomes conductive during the burst period at a time that there is the difference (phase error) between both the signals (SI and RS) inputted to the comparator 32, and then, the low level signal from the comparator 32 is applied to the low-pass filter 44, whereby the capacitor of the low-pass filter 44 is discharged. Therefore, a control signal by which the oscillation frequency of the VCO 24 is made larger is outputted form the low-pass filter 44.

In response to the control signal outputted from the low-pass filter 44, from the VCO 24, that is, the PLL 12, the sampling clock having the oscillation frequency which is changed according to the phase error data (ΔE or −ΔE) is outputted. Therefore, the sampling clock having a phase relationship that is always fixed to the reference frequency signal (the subcarrier signal included in the inputted television signal) is outputted to the A/D converter 22.

Figure 5:
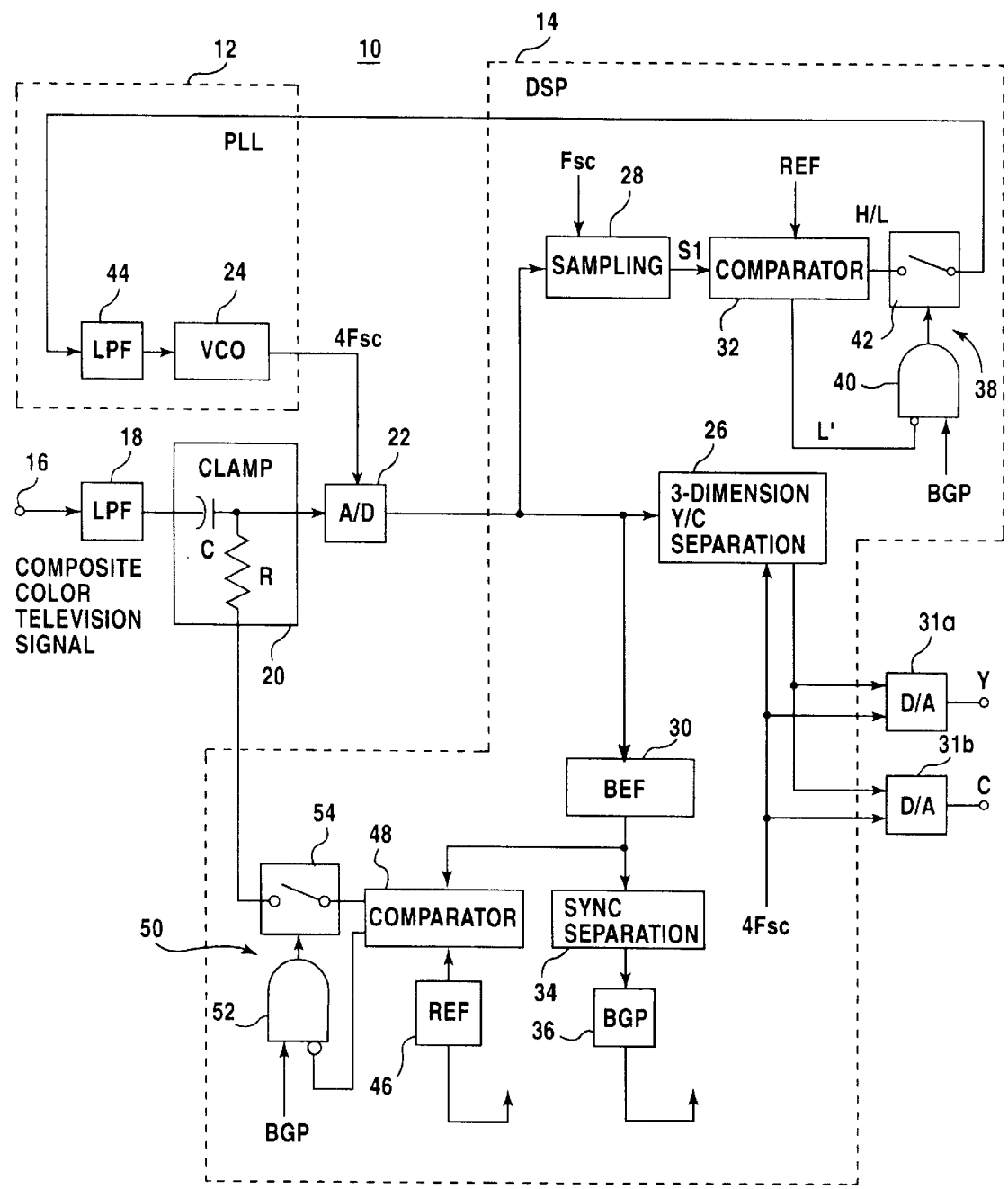
FIG. 5 is a block diagram showing another embodiment according to the present invention.

Another embodiment according to the present invention shown in FIG. 5 is different from FIG. 3 embodiment in the following points. More, specifically, in the embodiment shown in FIG. 3, the luminance signal data from the BEF 30 is applied to the comparator 32 as the comparative signal (RS) for the comparator 32. In contrast, in this embodiment shown in FIG. 5, data indicating a reference pedestal level (pedestal data) is applied to the comparator 32 as the ocmparative signal. The pedestal data (REF) is outputted from a pedestal data generation circuit 46. The pedestal data (REF) is fixed (reference) data which is set in advance in a ROM included in the pedestal data generation circuit 46, and applied to the comparator 32 as well as a comparator 48.

Other than the pedestal data (REF), the luminance signal data from the BEF 30 is inputted to the comparator 48, and the both signal data are compared with each other. Then, a signal according to a difference between the luminance signal data and the reference pedestal data (REF) is outputted from the comparator 48. The signal from the comparator 48 is applied to a feed-back circuit 50 which is constructed in a manner similar to that of the aforementioned control signal generation circuit 38. That is, the output of the comparator 48 of the feed-back circuit 50 is applied to the clamp circuit 20 during only the burst period. More specifically, the feed-back circuit 50 includes an AND gate 52 which received at its inputs the burst gate pulse (BGP) form the burst gate pulse generation circuit 36 and an inversion of the signal from the comparator 48, and a tri-state switch 54 having three states which are changed-over by an output of the AND gate 52. Therefore, during only the burst period at a time that the difference occurs between the luminance signal data and the reference pedestal data (REF), the tri-state switch 54 becomes conductive. Then, the output signal from the comparator 48 is negatively-fed back to the clamp circuit 20 through the tri-state switch 54.

More specifically, in the comparator 48, the luminance signal data from the BEF 30 and the pedestal data (REF) are compared with each other, and if the difference occurs between both the data, the comparator 48 outputs the signal of a high level or a low level according to the difference. A capacitor included in the clamp circuit 20 is charged or discharged by the signal. That is, as shown in FIG 5, the clamp circuit 20 includes the capacitor C, and therefore, the clamp level of the clamp circuit 20 is changed by feeding-back the signal. Accordingly, the pedestal data of the video data after the A/D conversion is fixed at the reference pedestal data (REF).

Thus, the pedestal level after the digital conversion can be precisely settled, and therefore, it is possible to precisely set a phase of a reproduced sampling clock. Therefore, even if the clamp circuit 20 is an analog DC reproduction circuit, the pedestal level of the television signal being inputted to the A/D converter 22 is not changed. Accordingly, it is possible to fully use a whole dynamic range of the A/D converter 22.

In addition, in the control signal generation circuit 38, during only the burst period at a time that there is a difference (phase difference) between the sampled data (SI) from the sampling circuit 28 and the pedestal data (REF) from the pedestal data generation circuit 46, the tri-state switch 42 becomes conductive. Therefore, the output signal form the comparator 32 is applied to the low-pass filter 44 via the tri-state switch 42. The low-pass filter 44 includes the capacitor (not shown), and therefore, outputs a control voltage according to the difference between both the data (SI, REF) to the comparator 32, and the control voltage is applied to the VCO 24.

Figure 6A:
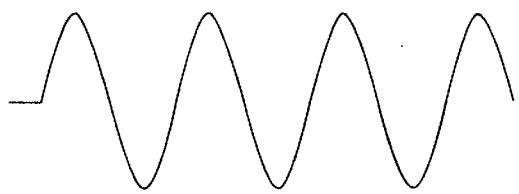
FIG. 6 is a wave-form chart showing a phase comparison operation in a comparator 32 in the embodiment shown in FIG. 5.
Figure 6B:
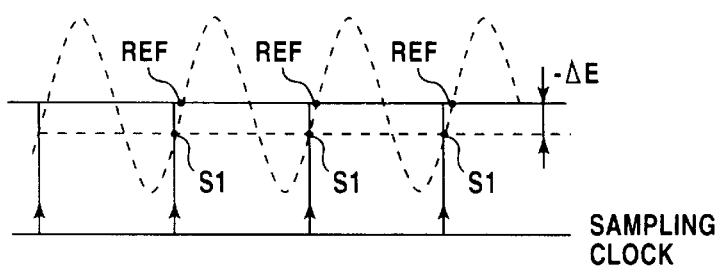
Figure 6C:
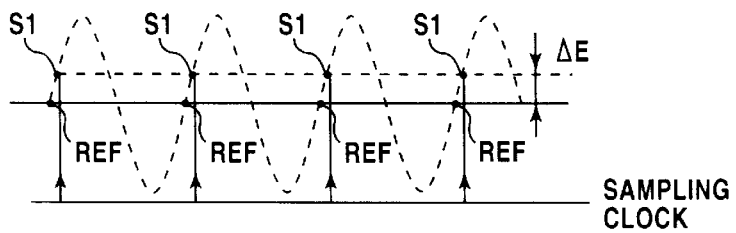
Figure 6D:
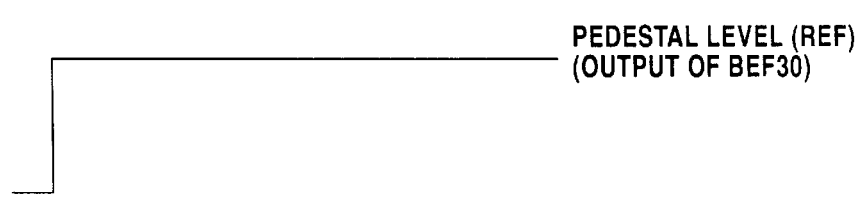

More specifically, FIG. 6(A) shows a subcarrier signal included in the television signal, and in the comparator 32, the pedestal data (REF) from the pedestal data generation circuit 46 as shown in FIG. 6(D) and the sampled data (SI) form the sampling circuit 28 are compared with each other, If the reference pedestal data (REF) is larger than the sampled data (SI), (SI−REF=ΔE) as shown in FIG 6(B), the high level signal, for example, is outputted form the comparator 32 to the tri-state switch 42. On the other hand, if the reference pedestal data (REF) is smaller than the sampled data (SI), (SI−REF=ΔE) as shown in FIG. 6(C), the low level signal, for example, is outputted from the comparator 32. As described above, the capacitor of the low-pass filter 44 is charged or discharged according to the high level signal or the low level signal form the comparator 32. Therefore, from the low-pass filter 44, the control signal by which the oscillation frequency of the VCO 24 is made larger or the control signal by which the oscillation frequency of the VCO 24 is made smaller is outputted.

Figure 7:
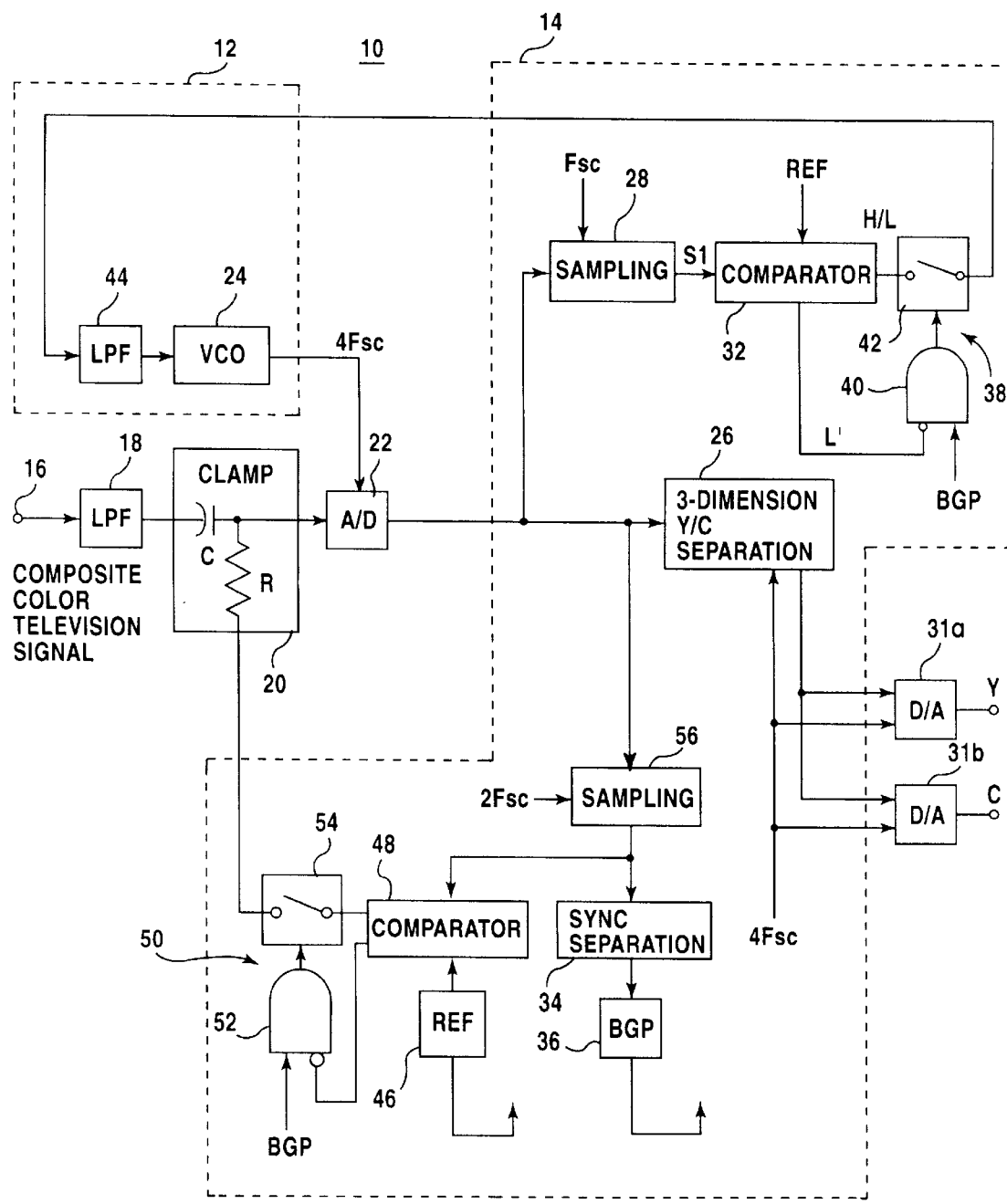
FIG. 7 is a block diagram showing a further embodiment according to the present invention.

A further embodiment according to the present invention shown in FIG. 7 is different from the embodiment shown in FIG. 5 in following point. In the embodiment shown in FIG.

7, instead of the BEF 30 of the embodiment shown in FIG. 5, sampling circuit 56 is used. That is, the video data from the A/D converter 22 is sampled by the sampling circuit 56 with a frequency of 2 Fsc (double the frequency of the subcarrier signal). Therefore, data (SC) of a DC level that the burst signal is eliminated is outputted. The data (SC) is applied to the comparators 48 and 32. Therefore, the reference pedestal data (REF) from the pedestal data generation circuit 46 and the DC level data (SC) are compared with each other in the comparator 48. Then, the signal is response to the difference between the data (SC) and the pedestal data (REF) is outputted from the comparator 48, and therefore, the clamp level of the clamp circuit 20 is controlled by the signal.

Figure 8A:
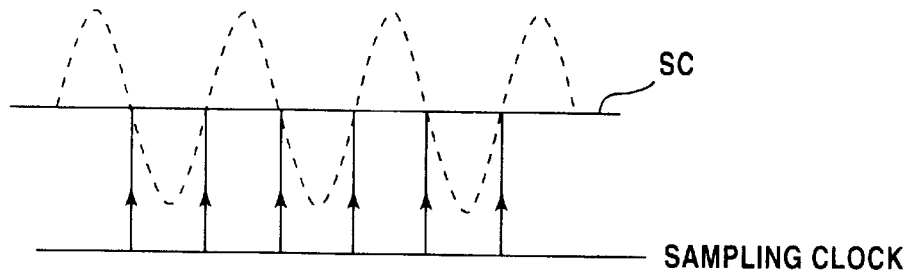
FIG. 8 is a wave-form chart showing a phase comparison operation in a comparator 48 in the embodiment shown in FIG. 7.
Figure 8B:
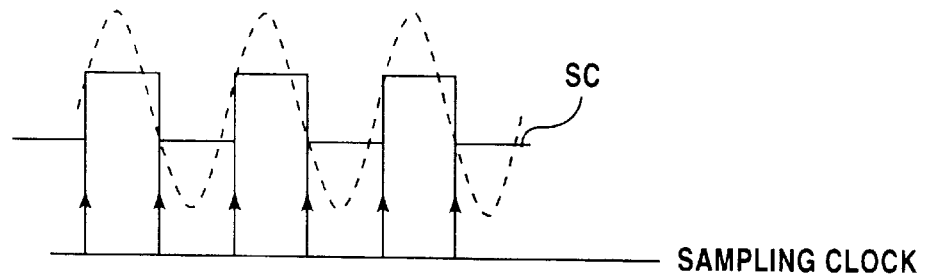
Figure 8C:
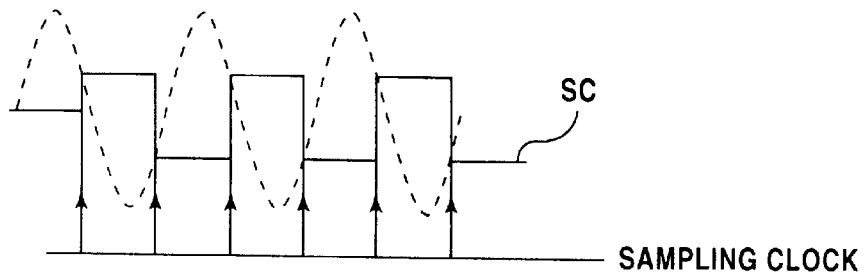

More, specifically, with reference to FIG. 8, if the oscillation signal of the VCO 24 and the subcarrier frequency of the inputted burst signal are the same, the sampled data (SC) shown in FIG. 8(A) is outputted form the sampling circuit 56. That is, in the sampling circuit 56, the inputted bust data is eliminated. On the other hand, if there is a difference (phase error) between the oscillation frequency of the VCO 24 and the subcarrier frequency of the inputted burst signal, as shown in FIG. 8(B) or FIG. 8(C), a burst frequency component is leaked from the sampling circuit 56.

The sampled data (SC) is applied to the comparator 48, and in the comparator 48, the reference pedestal data (REF) from the pedestal data generation circuit 46 and the sampled data (SC) are compared with each other, Then, the signal according to the difference between the sampled data (SC) and the reference pedestal data (REF) is outputted from the comparator 48.

The signal from the comparator 48 is applied to the feed-back circuit 50, and therefore, during only the burst period, the output from the comparator 48 is applied to the clamp circuit 20. More specifically, the feed-back circuit 50 includes the AND gate 52 which received the burst gate pulse (BGP) from the burst gate pulse generation circuit 36 and an inversion of the signal from the comparator 48, and the tri-state switch 54 having the three states changed-over by the output of the AND gate 52. Therefore, during only the burst period at a time that the difference occurs between the sampled data (SC) and the reference pedestal data (REF), the tri-state switch 54 becomes conductive. Therefore, the output signal from the comparator 48 is negatively-fed back to the clamp circuit 20.

More specifically, in the comparator 48, the sampled data (SC) from the sampling circuit 56 and the reference pedestal data (REF) are compared with each other, and if difference (voltage difference) occurs between both the data, the comparator 48 outputs the high level signal or the low level signal according to the difference. The signal is applied to the clamp circuit 20 via the tri-state switch 54, whereby the capacitor C of the clamp circuit 20 is charged or discharged. That is, the clamp circuit 20 includes the capacitor C as shown in FIG. 7, and the capacitor C is charged or discharged by the signal being fed-back, and therefore, the clamp level of the clamp circuit 20 is changed. Accordingly, the pedestal data of the video data after the A/D conversion is fixed at the reference pedestal data (REF).

Figure 9:
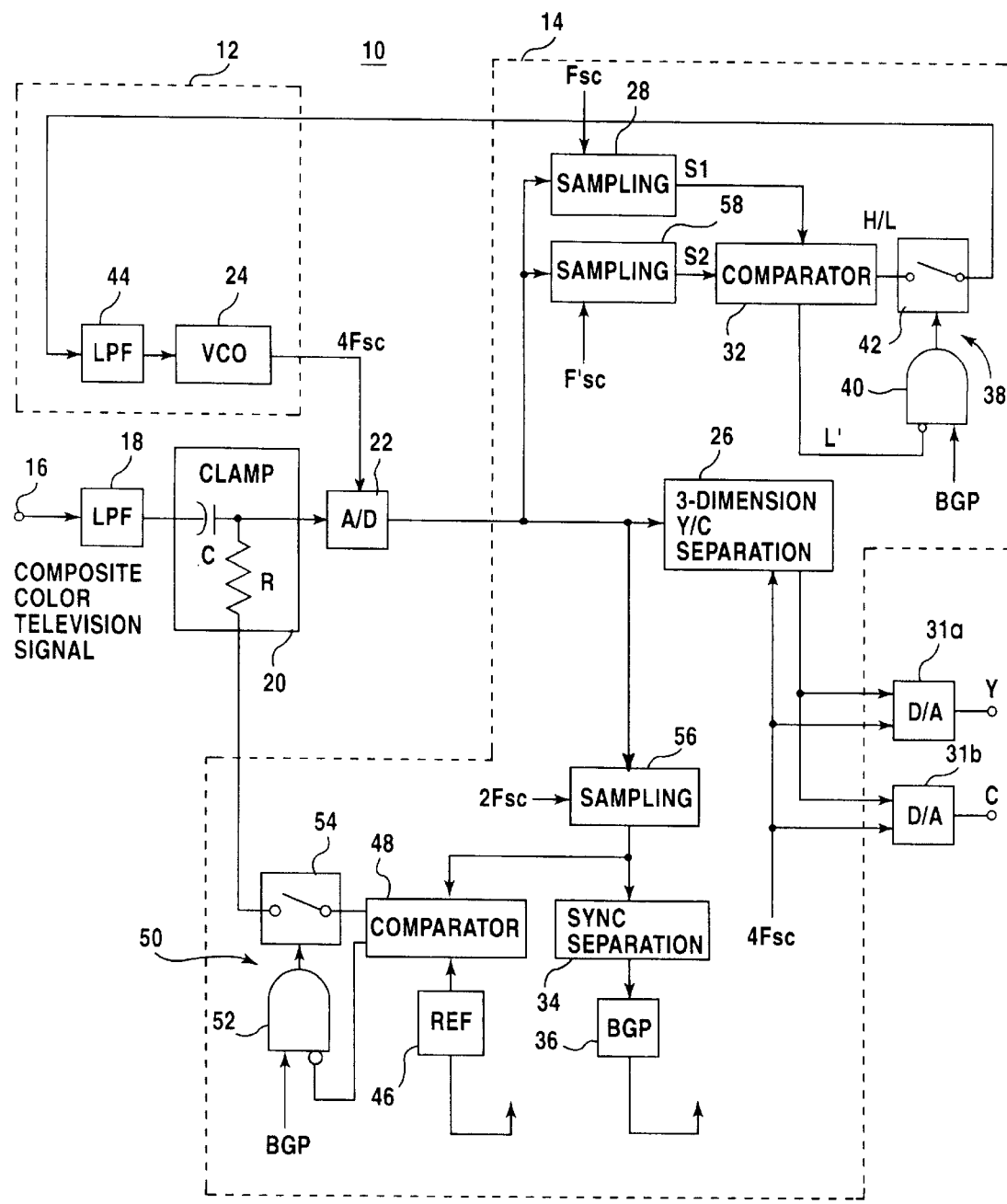
FIG. 9 is a block diagram showing a still further embodiment according to the present invention.

A still further embodiment according to the present invention shown in FIG. 9 is similar to the embodiment shown in FIG. 7 in the except following points. More specifically, the video data from the A/D converter 22 is applied to the sampling circuit 28 and a sampling circuit 58. The digital video signal (video data) inputted to the sampling circuit 28 is sampled with the frequency (Fsc) of the subcarrier signal, and therefore, sampled data (S1) is outputted from the sampling circuit 28 to the comparator 32. Furthermore, from the sampling circuit 58, sampled data (S2) having a phase different between a phase of the sampled data (Si) by 180 degrees is outputted. That is, in the sampling circuit 58, the video data is sampled with a signal (Fsc) obtained by inverting the subcarrier signal by 180 degrees. Then, in the comparator 32, the sampled data (S1) from the sampling circuit 28 and the sampled data (S2) from the sampling circuit 58 are compared with each other.

Figure 10A:
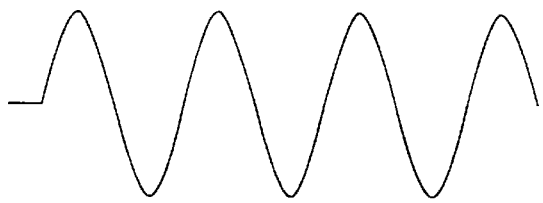
FIG. 10 is a wave-from chart showing a phase comparison operation in a comparator 32 in the embodiment shown in FIG. 9.
Figure 10B:
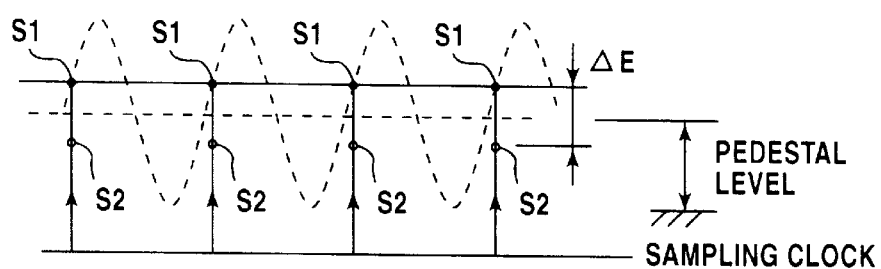

More specifically, in the comparator 32, the sampled data (S1) and the sampled data (S2) are compared with each other, and if the sampled data (S1) is larger than the sampled data (S2), (S1–S2=ΔE) as shown in FIG. 10(B), that is, if the sampling phase of the subcarrier signal is advanced to the inputted burst signal, the high level signal, for example, is outputted from the comparator 32 to the tri-state switch 42.

At this time, the changing-over signal (L') of the low level, for example, is also outputted form the comparator 32 to the AND gate 40. The changing-over signal (L') is outputted at a time that there is the difference between both the data (S1 and S2) being inputted to the comparator 32, S1≠S2. the tri-state switch 42 becomes conductive in response to the changing-over signal (L') and the burst gate pulse (BGP) from the burst gate pulse generation circuit 36, and the high level signal from the comparator 32 is applied to the low-pass filter 44. The capacitor (not shown) included in the low-pass filter 44 is charged by the high level signal. Therefore, the control signal by which the oscillation frequency of the VCO 24 is made smaller is outputted from the low-ass filter 44.

Figure 10C:
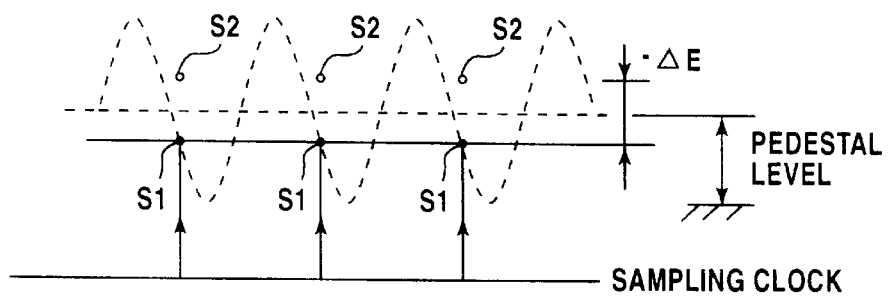

On the other hand, if the sampled data (S1) is smaller than the sampled data (S2), (S1–S2=–ΔE) as shown in FIG. 10(C), that is, if the sampling phase of the subcarrier signal is delayed to the input burst signal, the low level signal, for example, is outputted from the comparator 32. Therefore, the low level signal form the comparator 32 is applied to the low-pass filter 44 via the tri-state switch 42 in response to the burst gate pulse (BGP), and the capacitor of the low-pass filter 44 is discharged. Therefore, the control signal by which the oscillation frequency of the VCO 24 is made larger is outputted form the low-pass filter 44.

In addition, although the video data processed by the A/D converter 22 is sampled with two different signals (Fsc and Fsc) in FIG. 9 embodiment, the output of the A/D converter 22 may be applied to a 180 degrees phase shifter (not shown), and output of the phase shifter (the video data inverted by 180 degrees) may be inputted to the sampling circuit 28 or 58.

Figure 11:
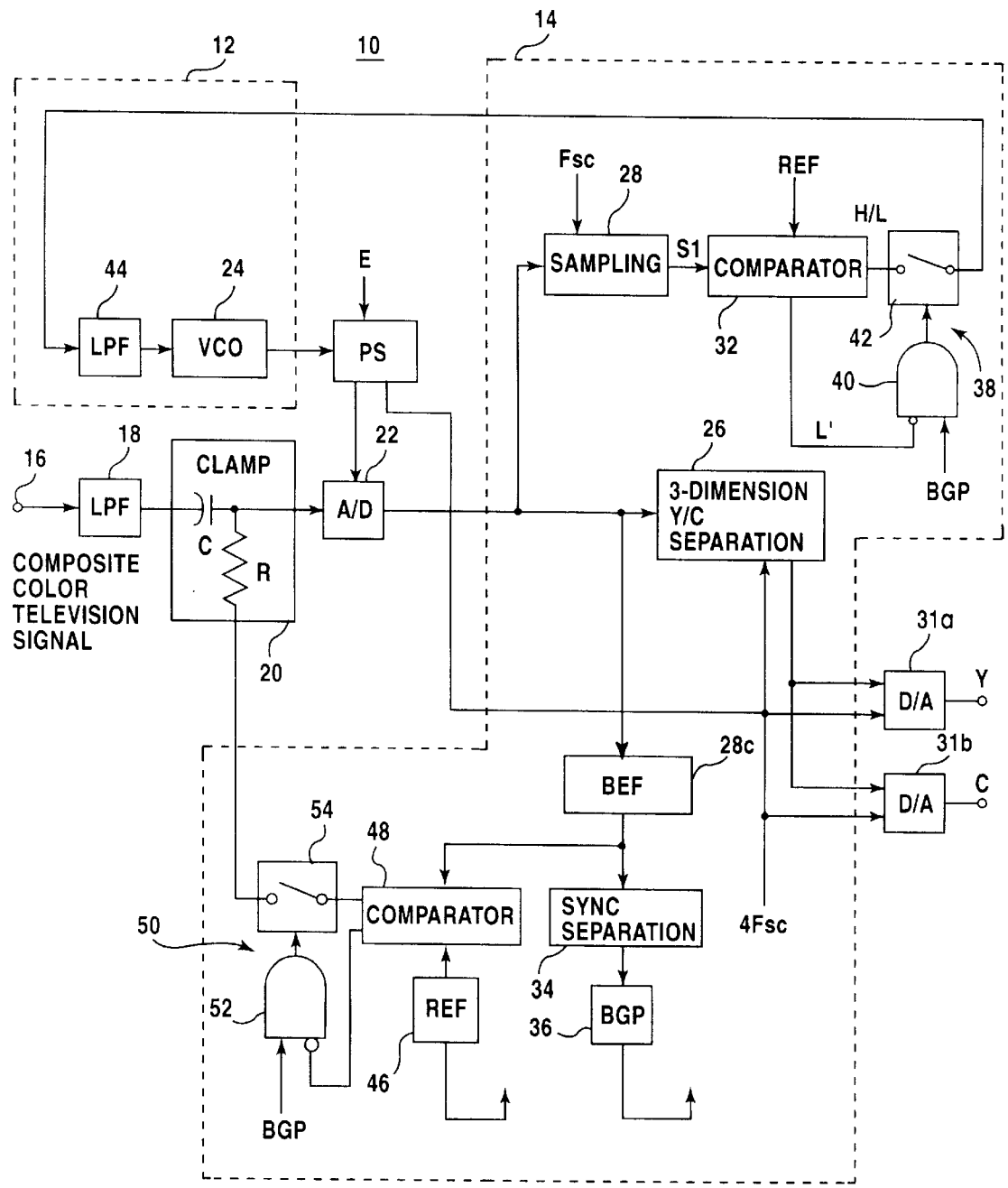
FIG. 11 is a block diagram showing the other embodiment according to the present invention.

The other embodiment according to the present invention shown in FIG. 11 is different embodiment shown in FIG. 7 in the in following point. More specifically, in order to remove the chrominance signal component form the output of the A/D converter 22, in the embodiment shown in FIG. 11 the BEF 30 which is utilized in the embodiments shown in FIG. 3 or FIG. is used instead of the sampling circuit 56 of the embodiment shown in FIG. 7.

Furthermore, in the embodiment shown in FIG. 11, the oscillation signal (4 Fsc) from the VCO 24 included in the PLL 12 is applied to a phase shifter 60. A phase shift amount by the phase shifter 60 is a fixed phase shift amount that is determined within a range of a quantizing phase error. Then, the A/D converter 22 converts the television signal into the television signal data, i.e., the video data on the basis of the oscillation signal (4 Fsc) from the VCO 24 or a signal obtained by phase-shifting the oscillation signal by a predetermined amount by the phase shifter 60.

On the other hand, as similar to the A/D converter 22, the oscillation signal (4 Fsc) from the VCO 24 or the signal obtained by phase-shifting the oscillation signal by the predetermined amount by the phase sifter 60 is applied to the sampling circuit 28 as the sampling clock. Therefore, the digital video signal inputted to the sampling circuit 28 is sampled with the subcarrier signal (Fsc) or the signal (Fsc) obtained by phase-shifting the subcarrier signal by the predetermined amount by the phase shifter 60. Therefore, sampled data (SI) is outputted from the sampling circuit 28 to the comparator 32. Then, in the comparator 32, the sampled data (SI) is compared with the reference pedestal data (REF) outputted from the pedestal data generation circuit 46. Accordingly, similar to the embodiment shown in FIG. 5 or FIG. 7, the capacitor of the low-pass filter 44 included in the PLL 12 is charged or discharged according to the high level signal or the low level signal form the comparator 32, whereby the oscillation frequency of the VCO 24 can be controlled.

In, addition, the horizontal synchronization signal form the synchronization signal separation circuit 34 is applied to a frequency-division circuit 62, and frequency-divided by ½, for example, in the frequency-division circuit 62, and then, inputted to the phase shifter 60 as an enable signal (E) for the phase shifter 60. Therefore, as described in the above, from the phase shifter 60, the clock signal (4 Fsc) from the VCO 24 and the signal (4 Fsc) obtained by phase-shifting the clock signal by the predetermined amount are outputted.

Figure 12:
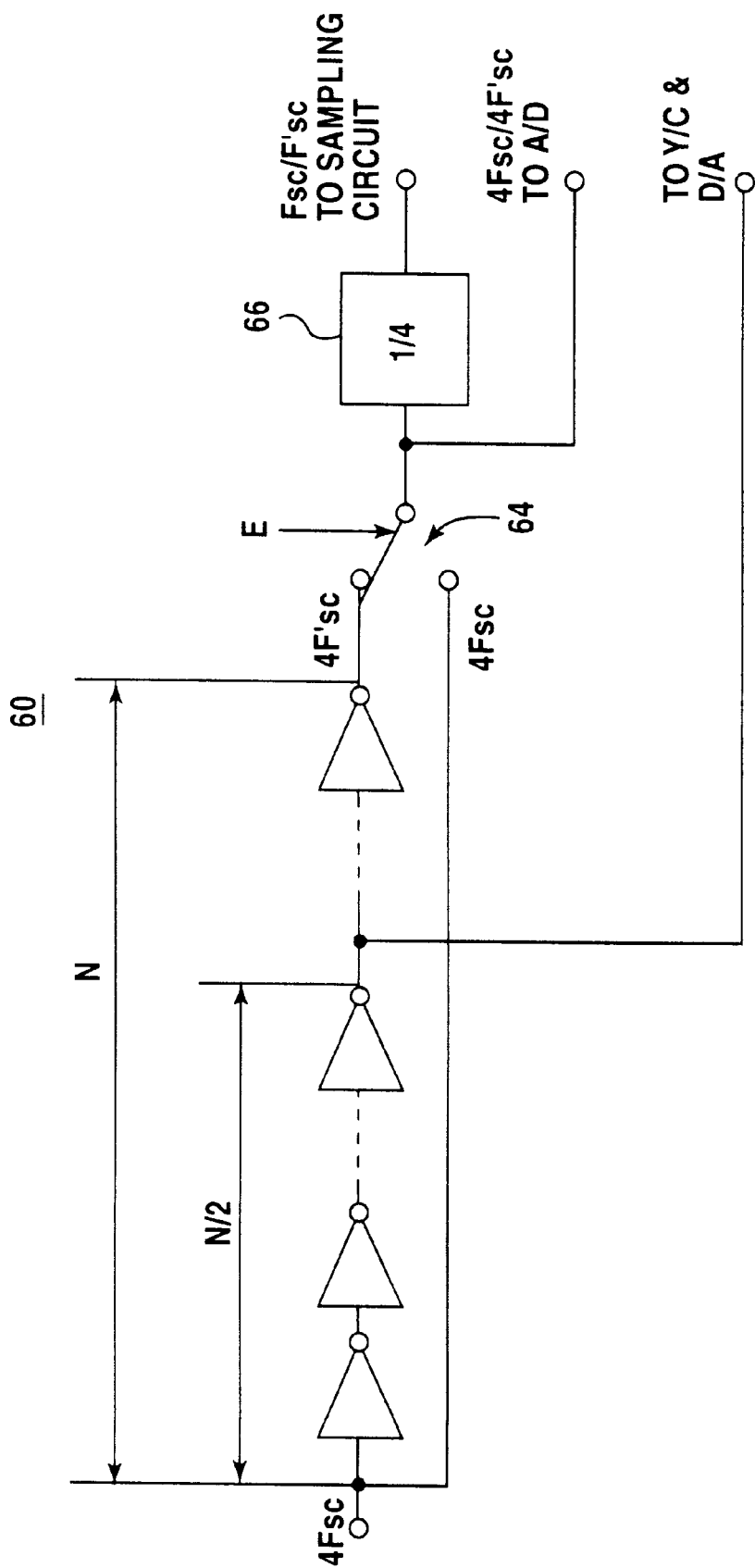
FIG. 12 is a block diagram showing a phase shifter in the embodiment shown in FIG. 12.

More, specifically, with reference to FIG. 12, the clock signal of 4 Fsc being inputted to the phase shifter 60 is phase-shifted by inverters by an N (even) number of stages. Furthermore, as shown in FIG. 12, the clock signal phase-shifted by inverters of N/2 stages is applied to the 3-dimension Y/C separation circuit 26 and the D/A converters 31a and 31b as reference clock signals. The signal (4 Fsc) being phase-shifted and the signal (4 Fsc) being not shifted are alternately selected at predetermined period intervals, e.g., at every one line by a switch 64 in accordance with the output signal (E) from the frequency-division circuit 62. The signal selected by the switch 64 is applied to the A/D converter 22, and the video signal is converted into the digital video signal on the basis of the signal. The signal from the switch 64 is also applied to the sampling circuit 28 after the same is frequency-divided ¼ by a frequency-division circuit 66.

Furthermore, with reference to FIG. 13, FIG. 13(A) shows the burst data after the A/D conversion in a case where the data of an amplitude direction is four bits and the sampling clock (Fsc) is sufficiently large. In addition, the burst data includes the quantizing phase error shown by "α" in FIG. 13(B), in general, the smaller data (the number of the bits) in the amplitude direction, the larger quantizing phase error (α).

Therefore, as described in the above, the phase shifter 60 is provided at a succeeding stage of the VCO 24, and as shown in FIG. 13(C) and FIG. 13(D), the phase shifter 60 phase-shifts the clock signal form the VCO 24 within a range (β) smaller than the quantizing phase error (α) at the predetermined intervals, e.g., at horizontal synchronization periods. The clock signal (4 Fsc) thus phase-shifted and the clock signal (4 Fsc) before phase-shift shown in FIG. 13(B) are alternately outputted at every one line in response to the signal (E) which is outputted from the frequency-division circuit 62 as the enable signal by frequency-dividing the horizontal synchronization signal by ½. That is, the clock signal is outputted from the phase shifter 60 as Fsc, F1sc, F2sc, . . . . Therefore, scattering if the quantizing phase errors is averaged, and accordingly, it is possible to reduce the quantizing phase error (α).

According to the above described embodiments, it is possible to implement most of components constituting the apparatus 10 by digital signal processing circuit, and therefore, by incorporating such the digital processing circuits into the DSP 14, it is possible to make the most of the components on a single chip IC.

In addition, as a means for removing the chrominance signal component form the video data, a low-pass filter (LPS) may be utilized instead of the above described BEF 30.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for processing a television signal, in which by applying a control signal to a circuit to be controlled, a signal at least one of a phase and a level of which is controlled is outputted from said circuit to be controlled, said apparatus comprising:

A/D converter means which performs an A/D conversion of at least an intermittent reference frequency signal included in said television signal;

a first sampling means which samples an output of said A/D converter means with a sampling clock and outputs first sampled data;

comparative signal data generation means having a constant level during at least a comparison period;

comparison means which compares said first sampled data and said comparative signal data with each other; and control signal generation means which applies the control signal on the basis of an output of said comparison means to said circuit to be controlled during a period of said intermittent reference frequency signal, wherein said comparative signal data generating means includes a second sampling means which samples the output of said A/D converter means and outputs second sampled data having a 180 degrees phase difference with respect to said first sampled data.

2. An apparatus according to claim 1, wherein said comparative signal data generation means includes filter means which removes a chrominance signal component from the output of said A/D converter means.

3. An apparatus according to claim 1, wherein said comparative signal data generation means includes pedestal data generation means which generates reference pedestal data.

4. An apparatus according to any one of claim 1 to wherein said reference frequency is a subcarrier frequency of the television signal.

5. An apparatus according to any one of claims 1 to wherein said circuit to be controlled includes a voltage-controlled oscillator having an oscillation frequency which is changed by said control signal, and said control signal generation circuit includes an analog low-pass filter which applies said control signal to said voltage-controlled oscillator by integrating the output of said comparison means, a tri-state switch inserted between the output of said comparison means and said analog low-pass filter, and switch control means which controls said tri-state switch in response to the output of said comparison means during a period of said reference frequency signal.

6. An apparatus according to claim 1, wherein said circuit to be controlled includes a clamp circuit which has a clamp level which is changed by said control signal and adjusts a pedestal level of said television signal according to the clamp level, and said A/D converter means performs the A/D conversion of said television signal being outputted from said clamp circuit.

7. An apparatus according to claim 6, wherein said comparative signal generating means includes pedestal data generation means which generates reference pedestal data.

8. An apparatus according to claim 6 or 7 wherein said reference frequency is a subcarrier frequency of said television signal.

9. An apparatus according to claim 6, wherein said control signal generation means includes a tri-state switch inserted between the output of said comparison means and said claim circuit, and switch control means which controls said tri-state switch in response to the output of said comparison means during a period of said reference frequency signal.

10. An apparatus according to any one of claims 6 to 9, wherein said first sampling means outputs said first sampled data by sampling the output of said A/D converter means with a frequency twice that of said reference frequency.

11. An apparatus according to claim 1, wherein said circuit to be controlled includes a variable frequency oscillator having an oscillation frequency which is changed by said control signal, said apparatus further comprising:

phase shifting means for shifting a phase of an oscillation signal output from said variable frequency oscillator by a predetermined amount; and switch means for alternately switching between an output of said phase shift means and said oscillation signal at predetermined intervals, wherein said A/D converter means performs the A/D conversion of said at least intermittent reference frequency signal of said television signal on the basis of an output signal from said switching means.

* * * * *